United States Patent [19]

Deak et al.

[11] 4,034,844

[45] July 12, 1977

[54] SYSTEM AND METHOD FOR STORING, HANDLING AND ORIENTING BOTTLES AND THE LIKE

[75] Inventors: Tibor E. Deak, Mount Dora; Leroy D. Magnus, Umatilla, both of Fla.

[73] Assignee: Doric Foods, Corporation, Mount Dora, Fla.

[21] Appl. No.: 622,035

[22] Filed: Oct. 14, 1975

[51] Int. Cl.² .................................. B65G 47/00
[52] U.S. Cl. .......................... 198/400; 193/46; 198/397
[58] Field of Search .......... 198/240, 248, 270, 272, 198/273, 278, 279, 280, 282, 287, 389, 394, 397, 400; 193/44, 46

[56] References Cited

U.S. PATENT DOCUMENTS

| | | | |
|---|---|---|---|
| 2,642,212 | 6/1953 | Currivan | 198/240 X |
| 3,407,917 | 10/1968 | Lockwood | 193/44 X |
| 3,822,031 | 7/1974 | Sterling | 198/272 X |
| 3,882,994 | 5/1975 | Mecks et al. | 198/273 X |

Primary Examiner—Evon C. Blunk
Assistant Examiner—Douglas D. Watts
Attorney, Agent, or Firm—Duckworth, Hobby, Orman, Allen & Pettis

[57] ABSTRACT

An apparatus and method for storing, handling and orienting a plurality of containers of the type having a narrow neck portion with respect to another portion of the container, in which the axis of each container extends axially through the neck, includes means, such as standard "unscramblers", for receiving and storing the containers in a randomly distributed fashion and thereafter conveying the containers with the axes of all of the containers oriented parallel with respect to each other. A cam race guide rail arrangement on opposite sides of the conveyor engage and orients the containers such that all of the axes of the containers are parallel with respect to each other in a plane substantially normal to the plane of the conveyor, and with all of the necks of the containers extending in the same direction.

10 Claims, 4 Drawing Figures

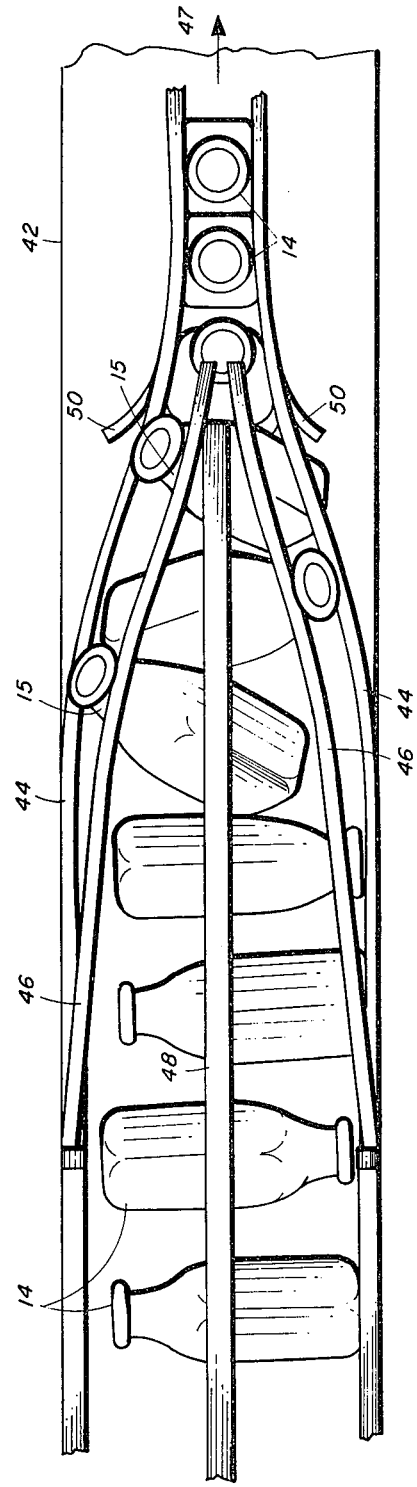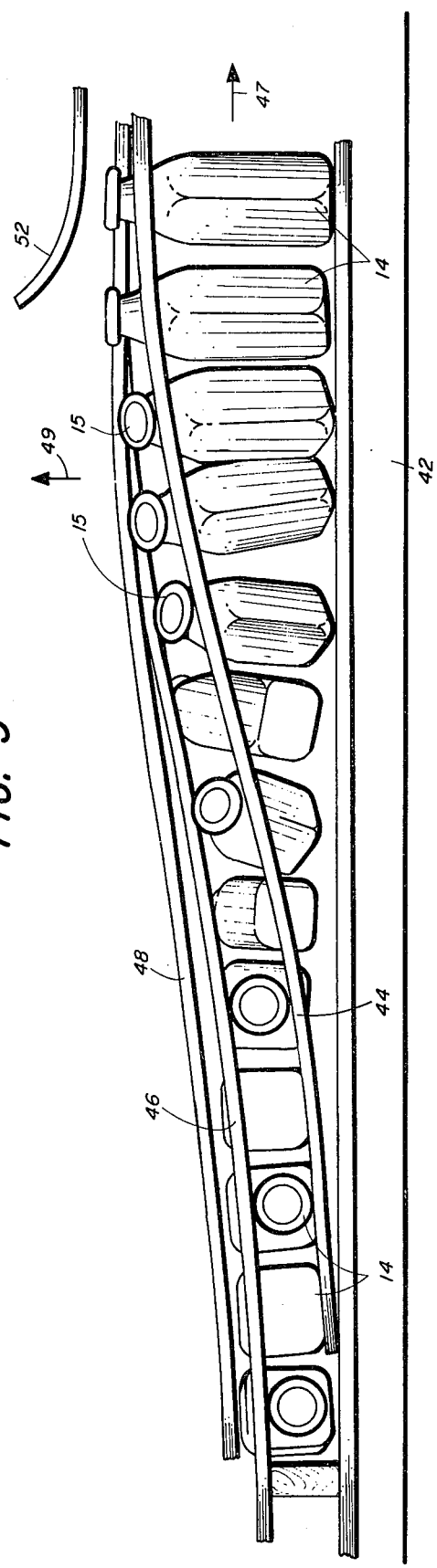

SYSTEM AND METHOD FOR STORING, HANDLING AND ORIENTING BOTTLES AND THE LIKE

BACKGROUND OF THE INVENTION

1. Field of the Invention

The present invention relates to handling systems and methods generally, and in particular, relates to systems and methods for plastic bottles and the like, which provide for the intermediate storage of the bottles, and which are capable of handling randomly distributed quantities of the bottles and orienting the necks thereof in the same direction, for filling.

2. Description of the Prior Art

Large beverage bottling facilities often have on-site blow molding equipment for manufacturing plastic bottles of the type to be used. In some cases, the newly molded containers are conveyed directly to the filling machine. In some situations, however, the output of the molding machines exceeds the filling machine capability, or alternatively, the labor force requirements are such that both the bottle making section and the bottle filling section cannot be operated continuously. In either event, it is frequently necessary to store large quantities of the unfilled, molded containers for a period of time.

One of the problems associated with such storage is the necessity to thereafter re-orient the necks of the bottles, such that when passed through the filling machine, the neck of each bottle is pointed in the correct direction. Of course, it is possible to maintain the proper neck orientation from the molding machine and during storage. However, such arrangements require expensive conveying and stacking equipment.

Prior U.S. Patents of interest to the present invention include Nos. 1,905,477 to Luce; 3,710,294 to Schultz; 3,277,988 to Medoff, 3,327,836 to Burt; 3,252,984 to Beert et al; 3,640,373 to Seragnoli.

SUMMARY OF THE INVENTION

The present invention contemplates a system and method for storing randomly distributed containers received as an output from a molding machine and thereafter receiving and orienting the containers such that the necks thereof are oriented in the proper direction prior to filling. Apparatus in accordance with the present invention is adapted for use with containers of the type having a narrow neck portion with respect to another portion of the container, with the axis of each container extending axially through the neck. The apparatus comprises first means for receiving the containers in a randomly distributed fashion and orienting the axes of all of the containers parallel with respect to each other. A second means receives the containers from the first means and conveys the containers in a first direction along a first plane, the axes of all of the containers being substantially parallel with the first plane. A third means following said second means along said first direction engages and orients the containers such that thereafter all of the axes thereof are parallel with respect o each other in a second plane which is substantially normal to the first plane, and with all of the necks of the containers extending in a second direction which is substantially perpendicular to the first direction.

THE DRAWING

FIGS. 3 and 4 are top and side views, respectively of container orienting equipment in accordance with the present invention.

DETAILED DESCRIPTION

A description of the system and method of the present invention is described with apparatus shown in FIGS. 1–4.

Figure 1:
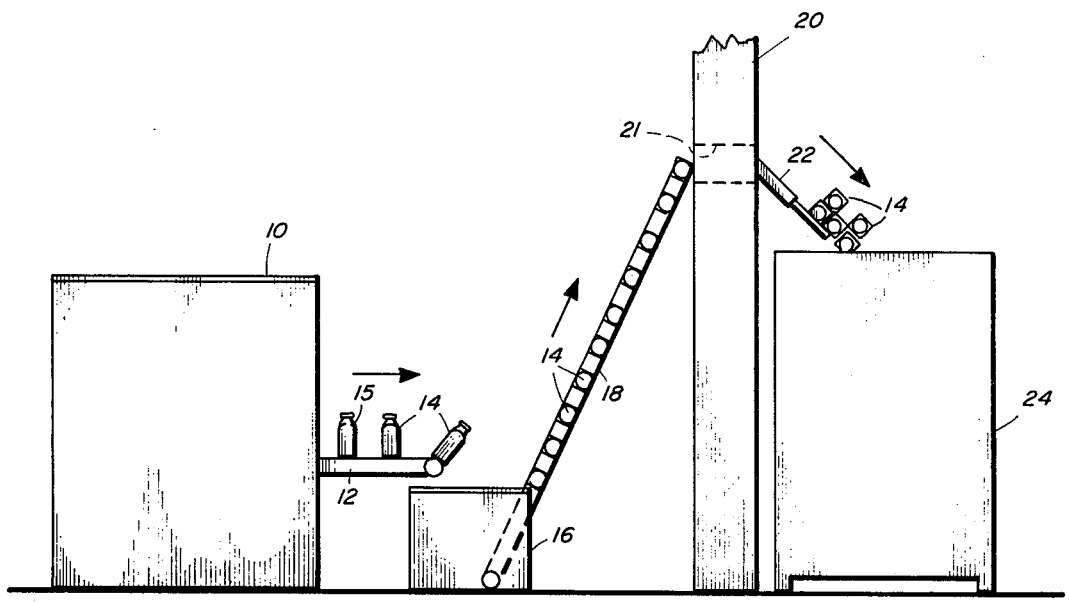
FIG. 1 is a side view of a portion of the system of the present invention.

Noting FIG. 1, the apparatus includes a molding machine 10 of conventional design. A conveyor 12 from the molding machine 10 conveys the molded containers, such as bottles 14 having narrowed neck portions 15 associated therewith, from the molding machine into a hopper 16. A lift conveyor 18 extends into the hopper 16, for lifting the containers 14 to an elevated height. While not essential, the lift conveyor 18 may be supported by a bulkhead 20 to which an opening 21 passes, to allow the containers 14 to be dumped onto a chute 22 and thereafter into a storage bin 24. After the bottles 14 are randomly dumped into the storage bin 24, the bottles may be maintained in storage until a demand is made for additional bottles.

Figure 2:
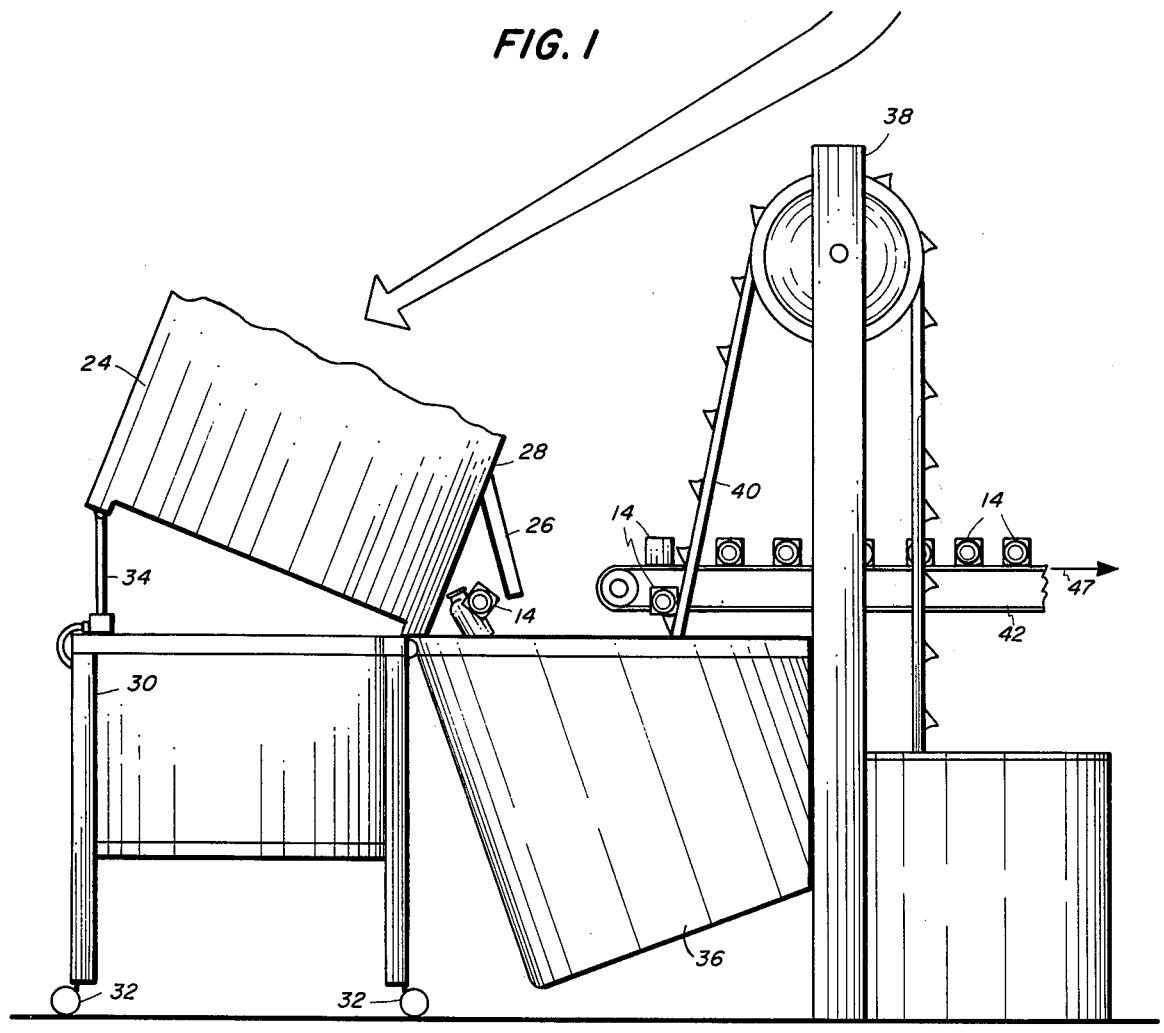
FIG. 2 is a side view of another portion of the system of the present invention.

Reference is now made to FIG. 2. In accordance with one aspect of the present invention, the storage bin 24 includes a trap door 26 defining an opening along a lower portion of a vertical side 28 thereof. When additional bottles are required for a filling operation, or the like, the storage bin 24 is positioned on a platform 30 which is movably supported by wheels 32. The platform 30 is provided with a hydraulic lift arm 34 at one side thereof, which is adapted to extend upward and engage the bottom of the storage bin 24, in order to tilt the bin forward and allow the bottles 14 to be dumped out of the opening defined by the trap door 26, and into a second hopper 36. An unscrambling device 38, of a type which is presently commercially available, is associated with the hopper 36 so as to remove the bottles 14 from the hopper and align the randomly distributed bottles in the hopper 36 such that the axes of all of the containers 14 are oriented parallel with respect to each other. A commercially available unscrambling device suitable for use as the device 38 in FIG. 2 is manufactured by Pace Packaging Company, Fairfield, N.J. The unscrambling device 38 deposits the containers 14 on a conveyor 42 with all of the axes of the containers parallel with respect to each other, but with the necks oriented in random directions.

Referring now to FIGS. 3 and 4, there is provided two pairs of rails each disposed on opposite sides of the conveyor 42. Each combination of rails includes a lower rail 44 and an upper rail 46. The rails 44 and 46 may comprise a tubular material; or alternatively, may comprise flat metal stock. Each pair of rails 44, 46 defines a cam race which engages the narrowed neck 15 of each bottle 14 and cams the respective bottle into an upright position. As shown in FIGS. 3 and 4, this is accomplished by disposing the rails in a curved fashion inward with respect to the other of the corresponding rails, the two top rails 46 tapering together in the direction of feed (note arrow 47), and with the two lower rails 44 tapering toward one another in the direction of feed 47 to a distance equal to the outside diameters of the necks 15 of the bottles, with the lower two rails thereafter extending substantially parallel in the direction of feed. A retaining rail 48 is provided, extending over the central portion of the conveyor 42, and between the upper rails 46 of each rail pair. The retaining rail 48 serves a function of preventing the bottles 14, which are generally plastic and light in weight, from buckling and misaligning. A pair of guide rails 50 are also provided on opposite sides of the bottles 14 passing between the parallel portions of the lower guide rails 44, to maintain alignment of the bottles 14 while moving in the direction of feed 47 and while in the upright position. A second retaining rail 52 is also provided to further guide the bottles 14 while passing through the parallel portions of the lower rails 44.

Operation of the system shown in FIGS. 1–4 will now be described. As discussed above, the bottles 14 may be stored for an indeterminate period of time in the storage bin 24. As demand requires, the bottles 14 may be fed out of the bin 24 and into the hopper 36 associated with the commercially available unscrambling equipment 38. The randomly distributed bottles 14 are then oriented such that the axes of all of the bottles are parallel with respect ot each other, and are placed on the conveyor 42 moving in the direction of feed 47 of FIGS. 3 and 4. While moving along the conveyor 42, all of the bottles 14 lie in a plane parallel with the conveyor 42. Thereafter, the narrowed neck 15 of each bottle engages one of the two cam races defined by the lower and upper rails 44, 46 on opposite sides of the container 42. Each bottle is cammed to an upright position, such that the axes of all of the bottles are pointing in a second direction 49 (note FIG. 4) which is substantially perpendicular to both the plane of the conveyor 42 and the direction of feed 47. Likewise, because of the parallel relationship between the lower rails 44 of each rail pair, the axes of all of the bottles 14 lie in a plane perpendicular to the first plane, that is, the plane of the conveyor 42, and parallel with the second direction 49. The bottles 14 may be then fed directly into bottle filling equipment or similar handling apparatus.

The system and method of the present invention allows large quantities of randomly distributed molded containers to be stored for a period of time, and thereafter pass through orientation equipment which establishes the proper orientation prior to filling. This prevents the requirement for utilizing stacking and indexing equipment during storage.

We claim:

1. Apparatus for handling and orienting a plurality of randomly distributed containers of the type having a narrowed neck portion with respect to another portion of said container, the axis of each container extending axially through the neck, said handling and orienting apparatus comprising:
    means for storing said randomly distributed containers;
    means for removing said randomly distributed containers from said storing means and feeding said containers into a first means;
    said first means fo receiving said containers from said removing means randomly distributed and for thereafter orienting the axes of all of said containers parallel with respect to each other, but with the necks of said containers pointed in different directions;
    second means for receiving said containers from said first means conveying said containers in a first direction along a first plane, the axes of all of said containers being substantially parallel with said first plane; and
    first and second cam races, each on one side of said second means along said first direction for engaging said container necks and orienting said containers, both said cam races engaging and rotating the necks thereof such that thereafter all of the axes are parallel with respect to each other in a second plane substantially normal to said first plane, and with all of said necks extending in a second direction substantially perpendicular to said first direction.

2. The apparatus recited in claim 1 wherein each said cam race is defined by first and second rails, said first rail spaced above said second rail a distance equal to the outside diameter of said container neck.

3. The apparatus recited in claim 2 wherein said first and second rails of said first cam race curve inward with respect to said first and second rail of said second cam race, said two first rails tapering together in said first direction and said two second rails tapering toward one another in said first direction to a distance equal to the outside diameter of said container necks and then said two second rails thereafter extending substantially parallel in first direction.

4. The apparatus recited in claim 3 further comprising a retaining rail extending over said second means and between said two first rails for retaining said containers onto said second means.

5. The apparatus recited in claim 4 further comprising two guide rails, each on one side of said second means and spaced between said scond means and the adjoining one of said second rails for guiding said containers along said second means after passing through said third means.

6. The apparatus recited in claim 5 further comprising:
    means for storing said randomly distributed containers; and
    means for removing said randomly distributed containers from said storing means and feeding said containers into said first means.

7. The apparatus recited in claim 5 wherein said storing means comprises a bin having an upper opening for entry of said containers, and a lower opening along one vertical side thereof for removal of said containers.

8. The apparatus recited in claim 7 wherein said means for removing said containers from said storing means comprises:
    a movable platform for supporting said bin thereon; and
    means for lifting said bin only adjacent a side opposite said one side, whereby said containers exit said bin from said lower opening and into said first means.

9. The apparatus recited in claim 7 wherein said first plane is substantially parallel with the horizontal, and said second plane extends vertically.

10. The apparatus recited in claim 9 wherein said second direction extends away from the horizontal.

* * * * *